(12) United States Patent
Hayashi et al.

(10) Patent No.: US 9,329,059 B2
(45) Date of Patent: May 3, 2016

(54) PHOTOELECTRIC ENCODER

(71) Applicant: MITUTOYO CORPORATION, Kawasaki-shi, Kanagawa (JP)

(72) Inventors: Kenichi Hayashi, Kawasaki (JP); Hiroaki Kawada, Kawasaki (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 378 days.

(21) Appl. No.: 13/767,101

(22) Filed: Feb. 14, 2013

(65) Prior Publication Data

US 2013/0214137 A1 Aug. 22, 2013

(30) Foreign Application Priority Data

Feb. 17, 2012 (JP) ................. 2012-033290

(51) Int. Cl.
G01D 5/30 (2006.01)
G01D 5/347 (2006.01)
G01D 5/34 (2006.01)

(52) U.S. Cl.
CPC ............ G01D 5/34746 (2013.01); G01D 5/345 (2013.01)

(58) Field of Classification Search
CPC ...................... G01D 5/34746; G01D 5/345
See application file for complete search history.

(56) References Cited

U.S. PATENT DOCUMENTS

| 6,166,817 | A | 12/2000 | Kuroda | |
| 8,507,841 | B2 * | 8/2013 | Endoh et al. | 250/216 |
| 2003/0160966 | A1 * | 8/2003 | Osaki et al. | 356/499 |

FOREIGN PATENT DOCUMENTS

| DE | 19938869 | 2/2000 | |
| EP | 1182468 A2 * | 2/2002 | .............. G02B 5/18 |
| JP | 2000-65529 | 3/2000 | |
| JP | 2000-081308 | 3/2000 | |
| JP | 2003-247867 | 9/2003 | |
| JP | 2011-237374 | 11/2011 | |
| WO | 2009/011356 | 1/2009 | |

OTHER PUBLICATIONS

European Search Report dated Mar. 25, 2014, 5 pages.
Japanese Office Action dated Nov. 26, 2015 with English Translation, 11 pages.

* cited by examiner

Primary Examiner — Tony Ko
(74) Attorney, Agent, or Firm — Rankin, Hill & Clark LLP

(57) ABSTRACT

A photoelectric encoder includes an irradiation unit configured to apply first and second irradiation light beams having a first linear polarization direction, a scale configured to produce first and second diffraction light beams having the first linear polarization direction by diffracting the first and second irradiation light beams, respectively, the scale having a glass plate whose front surface has a grating shape, a polarizing unit configured to convert the first diffraction light beam into a third diffraction light beam having a second linear polarization direction which is perpendicular to the first linear polarization direction, to produce first and second composite light beams by combining the second diffraction light beam and the third diffraction light beam, and to convert the first composite light beam into a circularly polarized third composite light beam, and a light receiver configured to receive the second composite light beam and the third composite light beam.

10 Claims, 5 Drawing Sheets

PHOTOELECTRIC ENCODER

CROSS-REFERENCE TO RELATED APPLICATION(S)

The present application claims the benefit of priority of Japanese Patent Application No. 2012-033290, filed on Feb. 17, 2012. The disclosures of this application are incorporated herein by reference.

BACKGROUND

1. Technical Field

The present invention relates to a photoelectric encoder which is used in a linear encoder etc.

2. Related Art

Photoelectric encoders are used for precise measurements of linear displacements etc. Among photoelectric encoders, a 2-phase detection type photoelectric encoder is widely known which detects light reception quantities of two light beams diffracted by a scale (refer to FIG. 5 of Patent document 1). However, in general, scales are made of an emulsion. The optical characteristics of the scale are varied due to a temperature or humidity variation, as a result of which the measurement accuracy of the photoelectric encoder is lowered.

PRIOR ART DOCUMENTS

Patent Documents

[Patent document 1] JP-A-2003-247867

SUMMARY

One or more exemplary embodiments of the present invention provide a photoelectric encoder in which the degradation in measurement accuracy due to a temperature or humidity variation is suppressed.

A photoelectric encoder according to the present invention includes an irradiation unit configured to apply first and second irradiation light beams having a first linear polarization direction, a scale configured to produce first and second diffraction light beams having the first linear polarization direction by diffracting the first and second irradiation light beams, respectively, the scale having a glass plate whose front surface has a grating shape, a polarizing unit configured to convert the first diffraction light beam into a third diffraction light beam having a second linear polarization direction which is perpendicular to the first linear polarization direction, to produce first and second composite light beams by combining the second diffraction light beam and the third diffraction light beam, and to convert the first composite light beam into a circularly polarized third composite light beam, and a light receiver configured to receive the second composite light beam and the third composite light beam.

The invention makes it possible to provide a photoelectric encoder in which the degradation in measurement accuracy due to a temperature or humidity variation is suppressed.

DETAILED DESCRIPTION

Embodiments of the present invention will be hereinafter described in detail with reference to the drawings.

Embodiment 1

Figure 1:
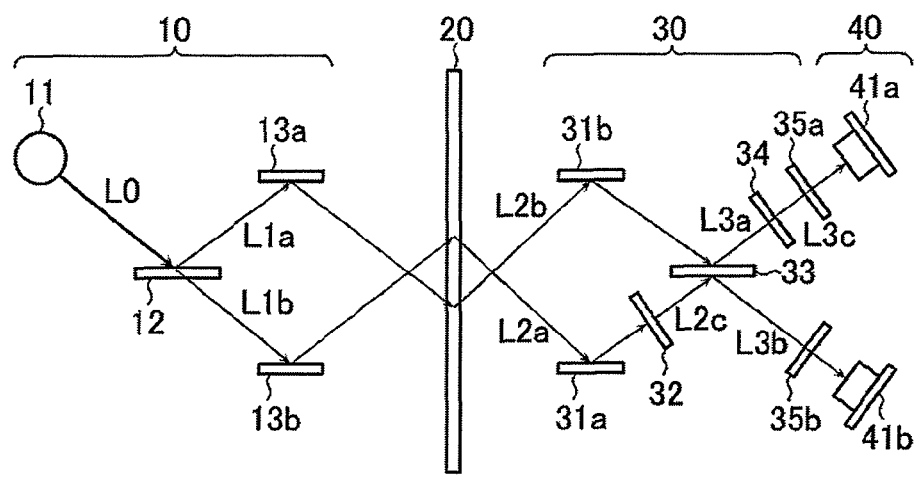
FIG. 1 is a schematic diagram of a photoelectric encoder according to a first embodiment.

FIG. 1 is a schematic diagram of a photoelectric encoder according to a first embodiment. As shown in FIG. 1, the photoelectric encoder includes an irradiation unit 10, a scale 20, a polarizing unit 30, and a light receiver 40. In the photoelectric encoder, light that is irradiated from the irradiation unit 10 is received by the light receiver 40 via the scale 20 and the polarizing unit 30. The irradiation unit 10, the polarizing unit 30, and the light receiver 40 are moved relative to the scale 20 in the measurement axis direction (i.e., the longitudinal direction of the scale 20), and their movement length is determined on the basis of variations of the light reception quantities of the light receiver 40.

The irradiation unit 10 outputs s-polarized irradiation light beams L1a and L1b. As shown in FIG. 1, the irradiation unit 10 has a light source 11, a non-polarizing beam splitter 12, and mirrors 13a and 13b. The light source 11 applies irradiation light L0 to the non-polarizing beam splitter 12 according to a drive current. In this embodiment, the wavelength of the irradiation light L0 is set at 655 nm. The non-polarizing beam splitter 12 splits the irradiation light L0 into irradiation light beams L1a and L1b and applies them to the respective mirrors 13a and 13b. In the embodiment, since only the s-polarized component (or the p-polarized component) of light emitted from the light source 11 is used for a measurement, the non-polarizing beam splitter 12 is used to fix the splitting ratio of the s-polarized component (or the p-polarized component). The mirrors 13a and 13b reflect the respective irradiation light beams L1a and L1b, and apply the resulting reflection light beams L1a and L1b to the scale 20. The mirrors 13a and 13b are disposed symmetrically with respect to the plane that is perpendicular to the measurement axis.

Figure 2:
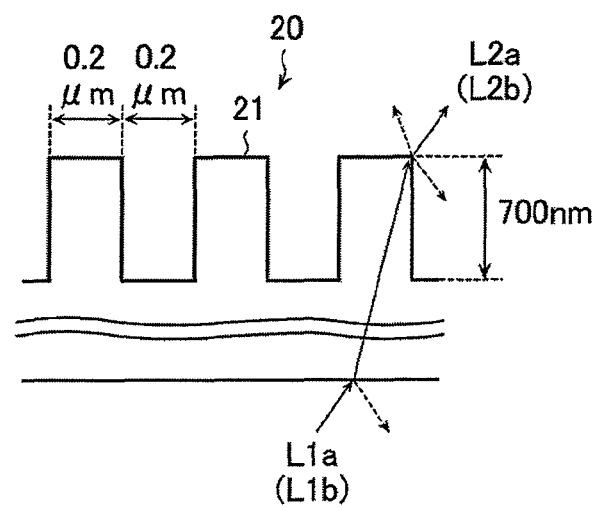
FIG. 2 is a sectional view of a scale 20 according to the first embodiment.

The scale 20 transmits and diffracts the irradiation light L1a and thereby produces s-polarized diffraction light L2a, and transmits and diffracts the irradiation light L1b and thereby produces s-polarized diffraction light L2b. The diffraction light beams L2a and L2b are first-order diffraction light beams of the irradiation light beams L1a and L1b, respectively. As shown in FIG. 2, a diffraction grating 21 is formed on the front surface of the scale 20 by etching a glass substrate directly. The diffraction grating 21 formed by etching a glass substrate has an advantage that they are varied less in optical characteristics due to a temperature or humidity variation than a diffraction grating made of an emulsion.

However, the thus-formed scale 20 has a disadvantage that the first-order diffraction efficiency of p-polarized light is extremely lower than that of s-polarized light.

More specifically, assume that the diffraction grating 21 of the scale 20 is formed by projections and recesses each of which is 0.2 μm in width and 700 nm in height or depth, and that irradiation light beams L1a and L1b having a wavelength 655 nm are incident onto the scale 20 at an incident angle 54.5°. In this case, the efficiency of first-order diffraction of p-polarized light by the scale 20 is about 1/10 of that of s-polarized light. The diffraction grating 21 of the scale 20 may be formed by projections and recesses each of which is 0.2 μm in width and 650 to 750 nm in height or depth. In this case, the angle of incidence of irradiation light beams L1a and L1b on the scale 20 is set at 45° to 65°. Under these conditions, the efficiency of first-order diffraction of p-polarized light by the scale 20 is about 1/20 to 1/6 of that of s-polarized light.

The polarizing unit 30 converts the s-polarized diffraction light L2a into p-polarized diffraction light L2c which is perpendicular to the former in polarization direction. The polarizing unit 30 produces composite light beams L3a and L3b by combining the diffraction light beams L2b and L2c. Furthermore, the polarizing unit 30 converts the composite light L3a into circularly polarized light L3c. As shown in FIG. 1, the polarizing unit 30 having the above functions can be constructed by mirrors 31a and 31b, a half-wave plate 32, a non-polarizing beam splitter 33, a quarter-wave plate 34, and polarizing plates 35a and 35b.

The mirrors 31a and 31b reflect the respective diffraction light beams L2a and L2b. The mirrors 31a and 31b are disposed symmetrically with respect to the plane that is perpendicular to the measurement axis. The half-wave plate 32 converts the s-polarized diffraction light L2a into p-polarized diffraction light L2c by rotating the polarization direction of the former by 90°. The non-polarizing beam splitter 33 produces composite light beams L3a and L3b by combining the diffraction light beams L2b and L2c. The quarter-wave plate 34 converts the composite light L3a into circularly polarized light L3c by giving a 90° phase difference to the two polarization components of the composite light L3a. The polarizing plates 35a and 35b which are disposed in such a manner that their optical axes form 45° with the composite light beams L3c and L3b, respectively, causes the two polarization components to interfere with each other. Resulting interference light beams are received by the light receiver 40.

As shown in FIG. 1, the light receiver 40 has an A-phase light receiver 41a and a B-phase light receiver 41b which receive the composite light beams L3c and L3b having a 90° phase difference. A direction and a length of a movement of the light receiver 40 relative to the scale 20 are detected on the basis of light reception quantities of the composite light beams L3c and L3b.

As described above, in the first embodiment, instead of being made of an emulsion, the scale 20 is formed by processing the front surface of a glass substrate into the diffraction grating 21 having the above-described shape. Glass is varied less in optical characteristics due to a temperature or humidity variation than emulsion. Therefore, the photoelectric encoder according to the first embodiment can suppress degradation in measurement accuracy due to a temperature or humidity variation. Furthermore, since the scale 20 used in the first embodiment produces only s-polarized first-order diffraction light beams with high first-order diffraction efficiency (higher than in the case of producing p-polarized first-order diffraction light beams), the light receiver 40 can receive composite light beams L3c and L3b so as to produce large light reception quantities.

Embodiment 2

Figure 3:
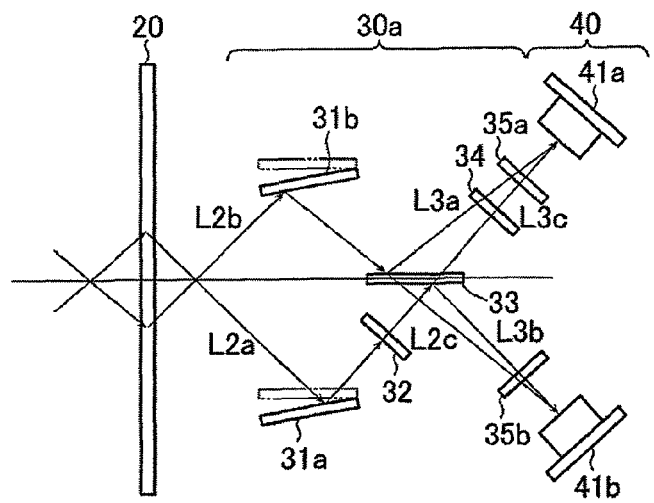
FIG. 3 is a schematic diagram including a polarizing unit 30a according to a second embodiment.

Next, a photoelectric encoder according to a second embodiment will be described with reference to FIG. 3. In the above-described first embodiment, the characteristic of the half-wave plate 32 has a variation. If the polarization direction rotation angle is deviated by such a variation, a phase difference occurs between composite light beams L3c and L3b which are received by the light receiver 40. In view of this, to decrease such a phase difference occurring between the composite light beams L3c and L3b, a polarizing unit 30a used in the second embodiment is constructed so as to be able to decrease the optical path difference between diffraction light beams L2c and L2b. The second embodiment is different from the first embodiment only in this feature.

The polarizing unit 30a used in the second embodiment is constructed so that the angles of the respective mirrors 31a and 31b with respect to the measurement axis are adjustable. The angles of the respective mirrors 31a and 31b with respect to the scale 20 are adjusted so that the optical path difference between the diffraction light beams L2c and L2b is decreased.

As described above, in the second embodiment, the polarizing unit 30a is constructed so as to be able to decrease the optical path difference between diffraction light beams L2c and L2b. If the optical path difference between diffraction light beams L2c and L2b is large, the variation of the coherency (signal efficiency) increases in accordance with the wavelength variation of the irradiation light. However, in the photoelectric encoder according to the second embodiment, since the optical path difference between diffraction light beams L2c and L2b is small, the signal can be stabilized. Further, this variation increases at an accelerated rate as the optical path difference becomes large. However, in the photoelectric encoder according to the second embodiment, since the optical path difference between diffraction light beams L2c and L2b is small, the influence of the dynamic variation (temperature variation, posture variation) of the optical path difference can be made small.

Embodiment 3

Figure 4:
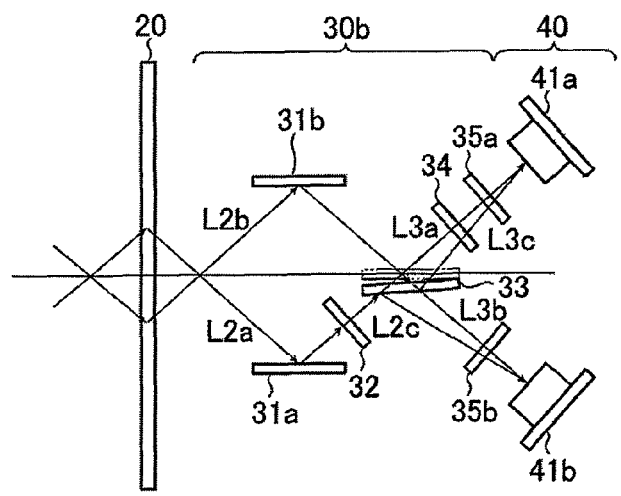
FIG. 4 is a schematic diagram including a polarizing unit 30b according to a third embodiment.

Next, a photoelectric encoder according to a third embodiment will be described with reference to FIG. 4. As in the second embodiment, a polarizing unit 30b used in the third embodiment is constructed so as to be able to decrease the optical path difference between diffraction light beams L2c and L2b.

The polarizing unit 30b is constructed so that the angle and the position of the non-polarizing beam splitter 33 with respect to the scale 20 are adjustable. The angle and the position of the non-polarizing beam splitter 33 with respect to the scale 20 are adjusted so that the optical path difference between diffraction light beams L2c and L2b is decreased.

Embodiment 4

Figure 5:
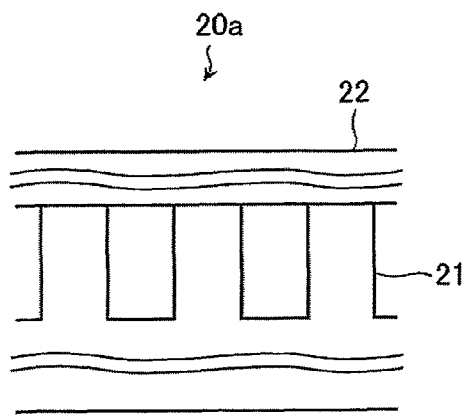
FIG. 5 is a sectional view of a scale 20a according to a fourth embodiment.

Next, a photoelectric encoder according to a fourth embodiment will be described with reference to FIG. 5. The fourth embodiment is different from the first to third embodiments only in a scale 20a. As shown in FIG. 5, the scale 20a has a protective layer 22 which covers the front surface of a glass plate 21 and transmits light. The protective layer 22 prevents the glass plate 21 from being scratched or stained. The protective layer 22 is made of glass or plastic, for example.

Embodiment 5

Figure 6:
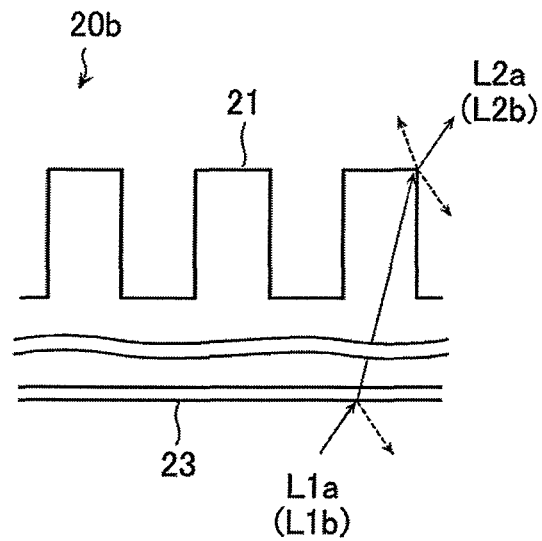
FIG. 6 is a sectional view of a scale 20b according to a fifth embodiment.

Next, a photoelectric encoder according to a fifth embodiment will be described with reference to FIG. 6. The fifth embodiment is different from the first to fourth embodiments only in a scale 20b. As shown in FIG. 6, the scale 20b has a reflection suppressing layer 23 which is formed on the back surface of a glass plate 21 and suppresses reflection of light. Since the reflection suppressing layer 23 increases the efficiency of first-order diffraction, the intensities of diffraction light beams L2a and L2b can be made higher than in the first embodiment. The reflection suppressing layer 23 is an AR coating, for example.

Embodiment 6

Figure 7:
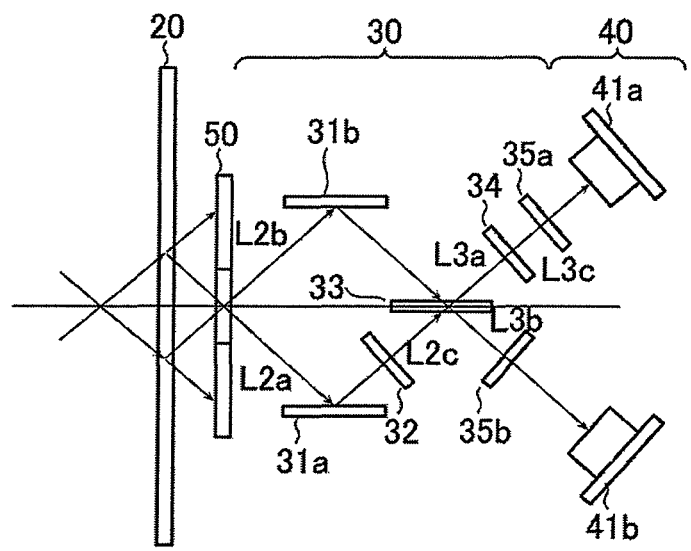
FIG. 7 is a schematic diagram including a light shield 50 according to a sixth embodiment.

Next, a photoelectric encoder according to a sixth embodiment will be described with reference to FIG. 7. Light received by the light receiver 40 other than light beams L3c and L3b that are detection subjects produces noise and thus lowers the measurement accuracy of the photoelectric encoder. In view of this, as shown in FIG. 7, the photoelectric encoder according to the sixth embodiment includes a light shield 50 in addition to the components of the photoelectric encoder according to the first embodiment. The light shield 50 is disposed between the scale 20 and the polarizing unit 30 and interrupts 0th-order diffraction components of respective irradiation light beams L1a and L1b. As a result, the light quantities, received by the light receiver 40, of the 0th-order diffraction components of the respective irradiation light beams L1a and L1b are suppressed accordingly. Thus, in the sixth embodiment, the measurement accuracy can be made higher than in the first embodiment.

Embodiment 7

Figure 8:
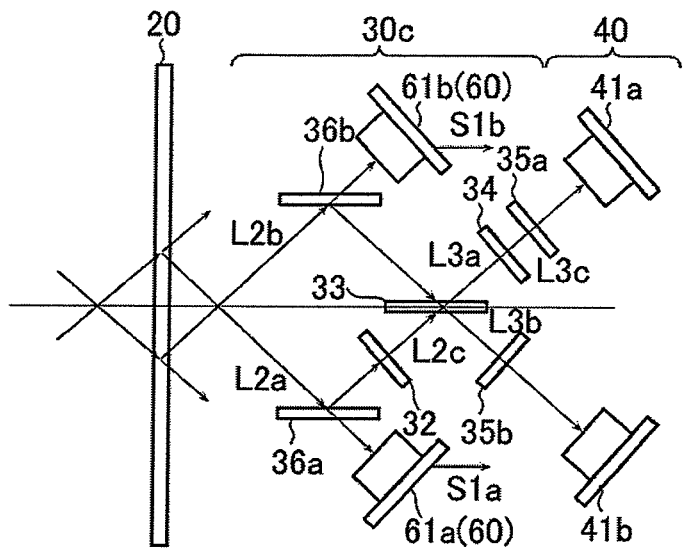
FIG. 8 is a schematic diagram including a light receiver 60 according to a seventh embodiment.

Next, a photoelectric encoder according to a seventh embodiment will be described with reference to FIG. 8. As shown in FIG. 8, the photoelectric encoder according to the seventh embodiment includes a light receiver 60 in addition to the components of the photoelectric encoder according to the first embodiment. The light receiver 60 receives diffraction light beams L2a and L2b and measures light reception quantities S1a and S1b, respectively. As shown in FIG. 8, to be compatible with the light receiver 60, a polarizing unit 30c has non-polarizing beam splitters 36a and 36b in place of the mirrors 31a and 31b. The light receiver 60 has output monitoring light receivers 61a and 61b.

The non-polarizing beam splitter 36a applies part of the diffraction light L2a to the output monitoring light receiver 61a, and applies the other part of the diffraction light L2a to the non-polarizing beam splitter 33. The non-polarizing beam splitter 36b applies part of the diffraction light L2b to the output monitoring light receiver 61b, and applies the other part of the diffraction light L2b to the non-polarizing beam splitter 33.

The output monitoring light receiver 61a receives the diffraction light L2a and measures a light reception quantity S1a, and the output monitoring light receiver 61b receives the diffraction light L2b and measures a light reception quantity S1b. The drive current of the light source 11 is controlled on the basis of the light reception quantities S1a and S1b, whereby the light quantity of irradiation light L0 (L1a and L1b) is controlled so as to be kept constant.

Embodiment 8

Next, a photoelectric encoder according to an eighth embodiment will be described with reference to FIG. 9. The eighth embodiment is different from the first to seventh embodiments only in a scale 20c. Whereas scales 20, 20a, and 20b used in the above embodiments transmit light, the scale 20c used in the eighth embodiment reflects light.

Figure 9:
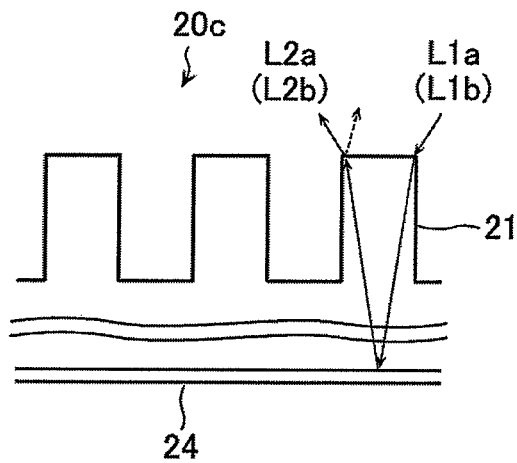
FIG. 9 is a sectional view of a scale 20c according to an eighth embodiment.

As shown in FIG. 9, the scale 20c has a reflection layer 24 which is formed on the back surface of a glass substrate 21 and reflects light. Irradiation light beams L1a and L1b incident onto the front surface of the glass substrate 21 are diffracted by the glass substrate 21, reflected by the reflection layer 24, and become diffraction light beams L2a and L2b. The reflection layer 24 is made of a metal, for example. A reflection photoelectric encoder can be constructed using the scale 20c, in contrast to the fact that transmission photoelectric encoders are constructed according to the first to seventh embodiments.

Embodiment 9

Next, a photoelectric encoder according to a ninth embodiment will be described with reference to FIG. 10. As in the second embodiment and third embodiment, a polarizing unit 30d used in the ninth embodiment is constructed so as to be able to decrease the optical path difference between diffraction light beams L2c and L2b.

Figure 10:
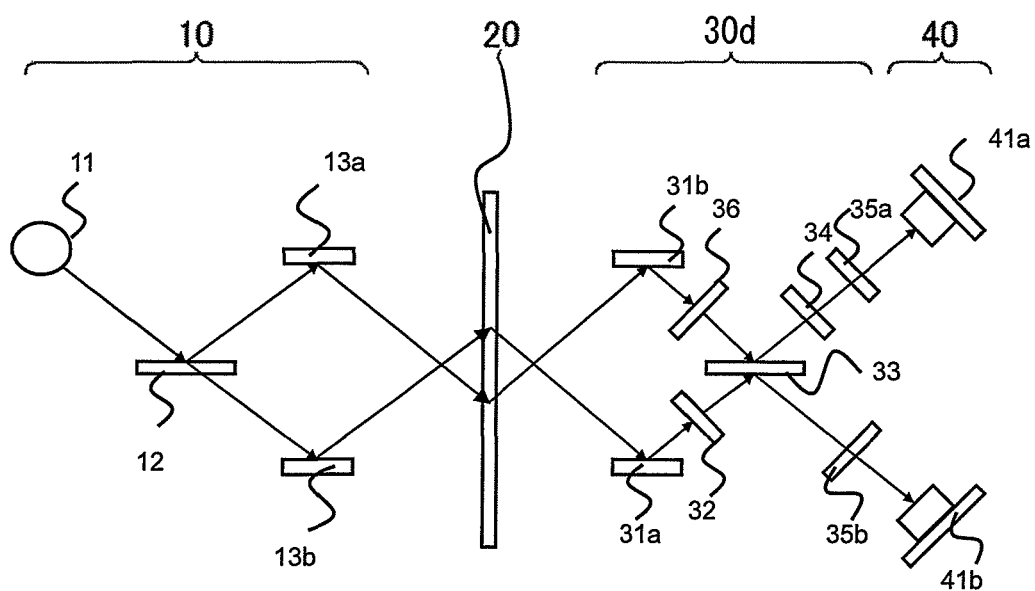
FIG. 10 is a schematic diagram including a polarizing unit 30d according to a ninth embodiment.

As shown in FIG. 10, the polarizing unit 30d has an optical path length correction member 36 in addition to the components of the polarizing unit 30 according to the first embodiment. The optical path length correction member 36 and the half-wave plate 32 are disposed symmetrically with respect to the plane that is perpendicular to the measurement axis. The optical path length correction member 36 corrects the optical path length of the diffraction light beam L2b so as to decrease the optical path difference between diffraction light beams L2c and L2b.

For example, the optical path length correction member 36 is made of a transparent glass plate whose thickness is equal to that of the half-wave plate 32 (the thickness of 0.4 mm, for example). The optical path length correction member 36 is not limited to this, but, its thickness may be different from that of the half-wave plate 32. Further, the optical path length correction member 36 may be a half-wave plate 32 instead of the glass plate. In this case, the direction of an optical axis of the optical path length correction member 36 has to be rotated by 90° with respect to the half-wave plate 32.

Although the embodiments of the invention have been described above, the invention is not limited to them and various modifications, additions, etc. are possible without departing from the spirit and scope of the invention. For example, two p-polarized irradiation light beams may be applied to the scale 20. In this case, satisfactory results are obtained as long as the efficiency of first-order diffraction of s-polarized light by the scale 20 is smaller than that of p-polarized light. Further, the invention may be combination of the third embodiment and the ninth embodiment. In this case, such a combination can be decrease the optical path difference between diffraction light beams L2c and L2b based on the amendment of the optical path length of the diffraction light beams L2b by the optical path length correction member 36 and the adjustment of the angle and the position of the non-polarizing beam splitter 33.

What is claimed is:
1. A photoelectric encoder comprising:
an irradiation unit configured to apply first and second irradiation light beams having a first linear polarization direction;
a scale configured to produce first and second diffraction light beams having the first linear polarization direction by diffracting the first and second irradiation light beams, respectively, the scale having a glass plate whose front surface has a grating shape formed by projections and recesses;

a polarizing unit configured to convert the first diffraction light beam into a third diffraction light beam having a second linear polarization direction which is perpendicular to the first linear polarization direction, to produce first and second composite light beams by combining the second diffraction light beam and the third diffraction light beam, and to convert the first composite light beam into a circularly polarized third composite light beam; and a light receiver configured to receive the second composite light beam and the third composite light beam, wherein the polarizing unit comprises:

a third mirror configured to reflect the first diffraction light beam;

a fourth mirror configured to reflect the second diffraction light beam; and a half-wave plate configured to convert the first diffraction light beam reflected from the third mirror into the third diffraction light beam having the second linear polarization direction by rotating a polarization direction of the first diffraction light beam.

2. The photoelectric encoder according to claim 1, wherein the irradiation unit comprises:

a light source configured to emit irradiation light;

a first non-polarizing beam splitter configured to split the irradiation light emitted from the light source into the first and second irradiation light beams so that each of the first and second irradiation light beams includes a component having the first polarization direction at a prescribed ratio; and a first mirror and a second mirror configured to reflect the first and second irradiation light beams produced by the first non-polarizing beam splitter, respectively.

3. The photoelectric encoder according to claim 1, wherein angles of the third mirror and the fourth mirror with respect to the scale are adjusted so that an optical path difference between the second diffraction light beam and the third diffraction light beam is decreased.

4. The photoelectric encoder according to claim 1, wherein the polarizing unit comprises:

an optical path length correction member configured to correct an optical path length of the second diffraction light beam reflected from the fourth mirror.

5. The photoelectric encoder according to claim 1, wherein:

the polarizing unit comprises a second non-polarizing beam splitter configured to produce the first and second composite light beams by combining the second diffraction light beam and the third diffraction light beam; and an angle and a position of the second non-polarizing beam splitter with respect to the scale are adjusted so that an optical path difference between the second diffraction light beam and the third diffraction light beam is decreased.

6. The photoelectric encoder according to claim 1, wherein the scale further has a protective layer configured to cover the front surface of the glass plate and to transmit the first and second diffraction light beams.

7. The photoelectric encoder according to claim 1, wherein the scale further has a reflection suppressing layer formed on a back surface of the glass plate, the reflection suppressing layer configured to suppress reflection of the first and second irradiation light beams.

8. The photoelectric encoder according to claim 1, further comprising:

a light shield disposed between the scale and the polarizing unit, the light shield configured to interrupt parts, transmitted by the scale, of the first and second irradiation light beams.

9. The photoelectric encoder according to claim 1, further comprising:

a monitoring light receiver configured to receive the first and second diffraction light beams and to measure first and second light reception quantities, respectively; and the irradiation unit adjusts light quantities of the first and second irradiation light beams to constant values on the basis of the first and second light reception quantities measured by the monitoring light receiver.

10. The photoelectric encoder according to claim 1, wherein the projections and recesses are between 650 to 750 nm in height or depth.

* * * * *